(12) United States Patent
Towler et al.

(10) Patent No.: US 7,431,843 B1
(45) Date of Patent: Oct. 7, 2008

(54) PROCESS FOR THE PURIFICATION OF SILICONE BASED SOLVENTS

(75) Inventors: Gavin P. Towler, Barrington, IL (US); Laszlo T. Nemeth, Barrington, IL (US)

(73) Assignee: UOP LLC, Des Plaines, IL (US)

( * ) Notice: Subject to any disclaimer, the term of this patent is extended or adjusted under 35 U.S.C. 154(b) by 301 days.

(21) Appl. No.: 10/918,880

(22) Filed: Aug. 16, 2004

(51) Int. Cl.
*C02F 3/00* (2006.01)

(52) U.S. Cl. .................. 210/660; 210/670; 210/673

(58) Field of Classification Search .......... 210/660, 210/670, 673
See application file for complete search history.

(56) References Cited

U.S. PATENT DOCUMENTS

| | | | |
|---|---|---|---|
| 3,274,124 A | 9/1966 | O'Hara | 252/451 |
| 3,331,881 A * | 7/1967 | Nixon et al. | 585/824 |
| 3,909,450 A | 9/1975 | O'Hara et al. | 252/438 |
| 4,248,706 A * | 2/1981 | Repik | 210/673 |
| 4,874,524 A * | 10/1989 | Liapis et al. | 210/672 |
| 4,988,659 A | 1/1991 | Pecoraro | 502/235 |
| 5,057,616 A * | 10/1991 | Jennings et al. | 549/298 |
| 5,116,592 A * | 5/1992 | Weinberg | 423/415.1 |
| 6,521,520 B1 | 2/2003 | May et al. | 438/595 |
| 6,645,908 B1 * | 11/2003 | Sigman et al. | 502/405 |
| 6,680,419 B2 * | 1/2004 | Satek et al. | 585/829 |
| 7,084,099 B2 * | 8/2006 | Radomyselski et al. | 510/285 |
| 2004/0193125 A1 * | 9/2004 | Williams | 604/367 |
| 2004/0198587 A1 * | 10/2004 | McKeown et al. | 502/100 |
| 2005/0257685 A1 * | 11/2005 | Baksh et al. | 95/96 |

* cited by examiner

*Primary Examiner*—Chester T Barry
(74) *Attorney, Agent, or Firm*—Arthur E. Gooding

(57) ABSTRACT

An apparatus and process for removing impurities from silicone based solvents is presented. The apparatus and process use an adsorbent for removing contaminants from the solvent, and when the adsorbent is sufficiently loaded with contaminants, the adsorbent is regenerated. The regeneration process entails a two stage heating process for recovery of solvent and removal of contaminants.

12 Claims, 2 Drawing Sheets

PROCESS FOR THE PURIFICATION OF SILICONE BASED SOLVENTS

FIELD OF THE INVENTION

The present invention relates to methods of purifying silicone based solvents that are used in the dry cleaning process.

BACKGROUND OF THE INVENTION

In the dry cleaning process, clothing or other fabrics to be cleaned are contacted with a solvent that removes dirt, oil and other substances from the clothing. This is a method of removing substances that are on fabrics that are not amenable to removal with aqueous based cleaning detergents. After cleaning the clothing and/or fabrics, the solvent is processed to remove the contaminants that were removed from the clothing, such that the solvent is recycled.

A prominent dry cleaning solvent is perchloroethylene. However, because perchloroethylene is an environmental and health hazard, there has been increasing pressure on the dry cleaning industry to use alternatives to perchloroethylene that are more environmentally friendly. This has led to the development of new dry cleaning solvents, such as solvents based on silicone, or siloxanes. One particular solvent that has been developed by General Electric is decamethylcyclopentasiloxane, or D5. In addition, the new solvent delivers superior fabric quality.

Today, D5 solvent recovery systems typically use a batch-mode distillation process to purify the solvent. The distillation process is expensive and requires daily, manual intervention to clean the bottom of the distillation apparatus. Improvements in the methods of purifying and recycling cleaning solvents can save energy and money.

SUMMARY OF THE INVENTION

The invention comprises an apparatus and process for removing contaminants from silicone based solvents. The apparatus uses an adsorbent chosen for its selectivity in removing contaminants from a stream comprising the solvent, and recycling the stream for reuse. The adsorbent is subsequently regenerated using a two stage heating process. The first stage is a low level heating to recover residual solvent and to dry the adsorbent, and the second stage is a higher level heating to desorb, or decompose the contaminants and remove the contaminants from the adsorbent.

In one embodiment, the invention comprises a single heater with two levels of heating a gas for passing over the adsorbent.

In an alternate embodiment, the invention comprises two heaters, a first heater for heating a gas to recover residual solvent and to dry the adsorbent, and a second heater for heating the adsorbent to a greater temperature and removing the contaminants.

Other objects, advantages and applications of the present invention will become apparent to those skilled in the art from the following detailed description.

DETAILED DESCRIPTION OF THE INVENTION

Figure 1:
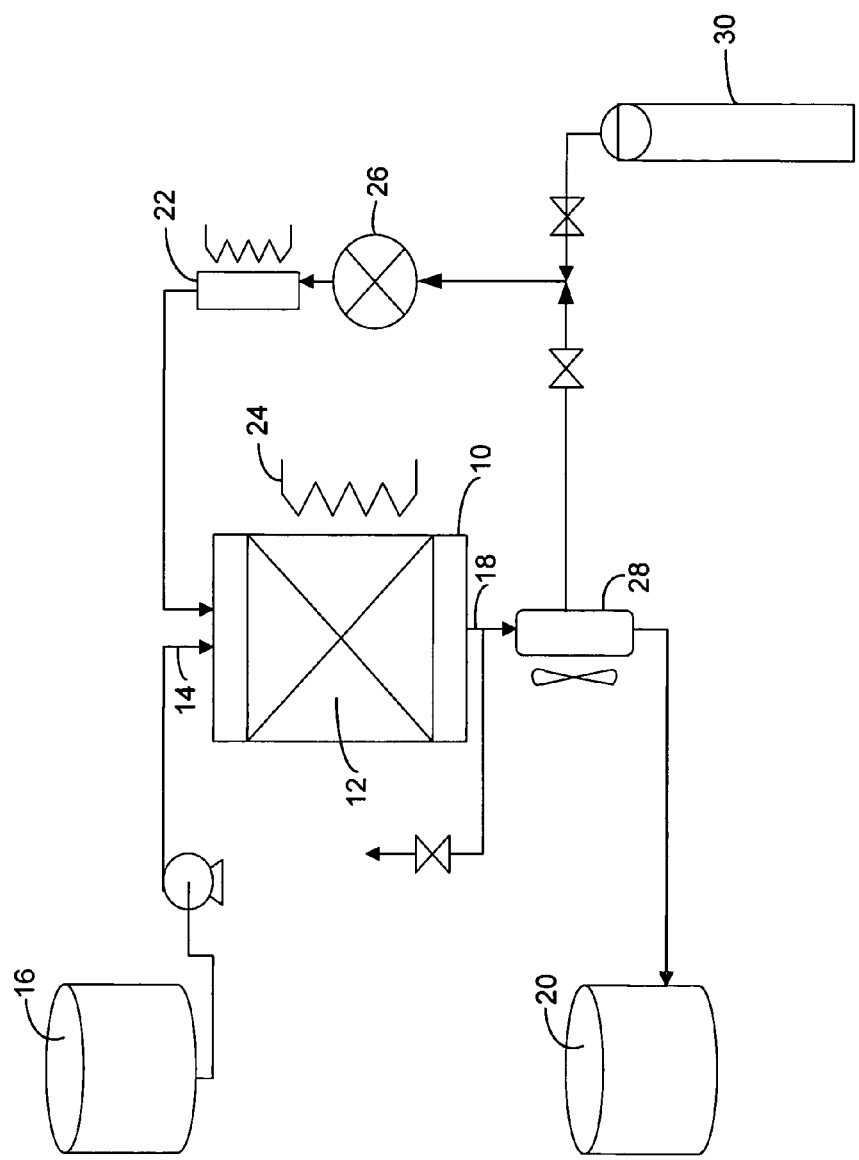
FIG. 1 is an apparatus for performing solvent regeneration.

Replacement cleaning solvents for perchloroethylene include silicone based compounds that are volatile cyclic, linear or branched siloxane compounds. Examples of these siloxane compounds include, but are not limited to, hexamethyldisiloxane, octamethyltrisiloxane, decamethyltetrasiloxane, dodecamethylpentasiloxane, tetradecamethylhexasiloxane, hexadecamethylheptasiloxane, methyltris(trimethylsiloxy)silane, octamethylcyclotetrasiloxane, decamethylcyclopentasiloxane (D5), dodecamethylcyclohexasiloxane, and tetradecamethylcycloheptasiloxane. Further description of these compounds is found in U.S. Pat. No. 6,521,580 B1, issued on Feb. 18, 2003, and is incorporated by reference in its entirety.

Development of a non-distillation purification system will simplify the recycling of the solvent and reduce the amount of energy needed to purify the solvent. In addition, the development of a non-distillation purification process will simplify the conversion from perchloroethylene to the siloxane solvents and reduce the cost of new dry cleaning machines by almost 50%. The use of adsorbents provides a more economical alternative to the typical batch mode distillation process. In addition, it is desirable to regenerate the adsorbents for reuse, minimizing waste of the solvent and adsorbent.

From an average single wash cycle, the average solvent contamination level is about 0.3% (or about 3000 ppm by weight). Most of the contaminants in the solvent fall into one of four major categories, surfactants, fatty acids, glycerides, and non-polar compounds. The surfactants are surface active agents and include, for example detergents, and make up about 60% of the contaminants; the fatty acids include for example oleic acid and make up about 15%; the glycerides include mono-, di-, and tri-glycerides and make up about 15%; and the non-polar compounds make up about 10% and include waxes, paraffins, and other hydrocarbon compounds. There are other contaminants, such as aldehydes, that are not listed but are also removed. This list is not meant to be comprehensive but only representative. Therefore, it is preferred to have an adsorbent that selectively adsorbs these materials, or a combination of adsorbents where each adsorbent selectively adsorbs one or more of these materials. It is also preferable that the adsorbents are easily regenerated.

The preferred adsorbents include, but are not limited to, high surface area carbons, aluminas, metal oxides, silica, zeolites, molecular sieves, mesoporous silica-alumina, and combinations of these adsorbents. Examples of preferred adsorbents include activated carbon, silica ($SiO_2$), zeolites, and mesoporous materials. In order to avoid confusion it is pointed out that the term silica/alumina does not mean a physical mixture of silica and alumina but means an acidic and amorphous material that has been cogelled or coprecipitated. The term is well known in the art, see e.g. U.S. Pat. Nos. 3,909,450; 3,274,124 and 4,988,659. Mesoporous materials are porous materials having uniform mesopores, or pores in the range from about 2 nm to about 50 nm, and have very high surface areas for adsorbing chemicals.

The adsorbents are regenerated to further improve the economics of solvent cleaning and regeneration.

An apparatus for purifying a stream comprising the solvent and regenerating the adsorbent is shown in FIG. 1. The apparatus comprises an adsorbent chamber 10 for holding an adsorbent 12. The solvent stream enters the adsorbent chamber 10 through an inlet 14, directed from a contaminated solvent supply source 16. Typically, the supply 16 is a holding tank for receiving contaminated solvent from dry cleaning establishments, and the solvent stream is pumped to the adsorbent chamber 10. The contaminated solvent stream passes over the adsorbent 12 wherein the impurities in the solvent stream are removed generating a purified solvent stream. The purified solvent stream exits the adsorbent chamber through an exit 18 and is collected in a storage tank 20 for later redistribution to dry cleaning establishments.

The apparatus further comprises a heating unit 22 for generating a heated gas to pass over the adsorbent 12. The heater 22 can be a two stage heater for generating a hot gas at two different temperature levels, or optionally, the apparatus includes a second heater 24 for providing heat at a second higher level. In one configuration of the present invention, the apparatus includes a blower 26 for recirculating hot gas over the adsorbent 12. The apparatus further includes a condensing unit 28 for recovering vaporized solvent from the adsorbent 12. The apparatus further comprises a source of gas 30 that can be passed over the adsorbent 12 during the second stage of heating. The heater 22 can be variable power for providing heat at two levels for the two stage heating process.

Figure 2:
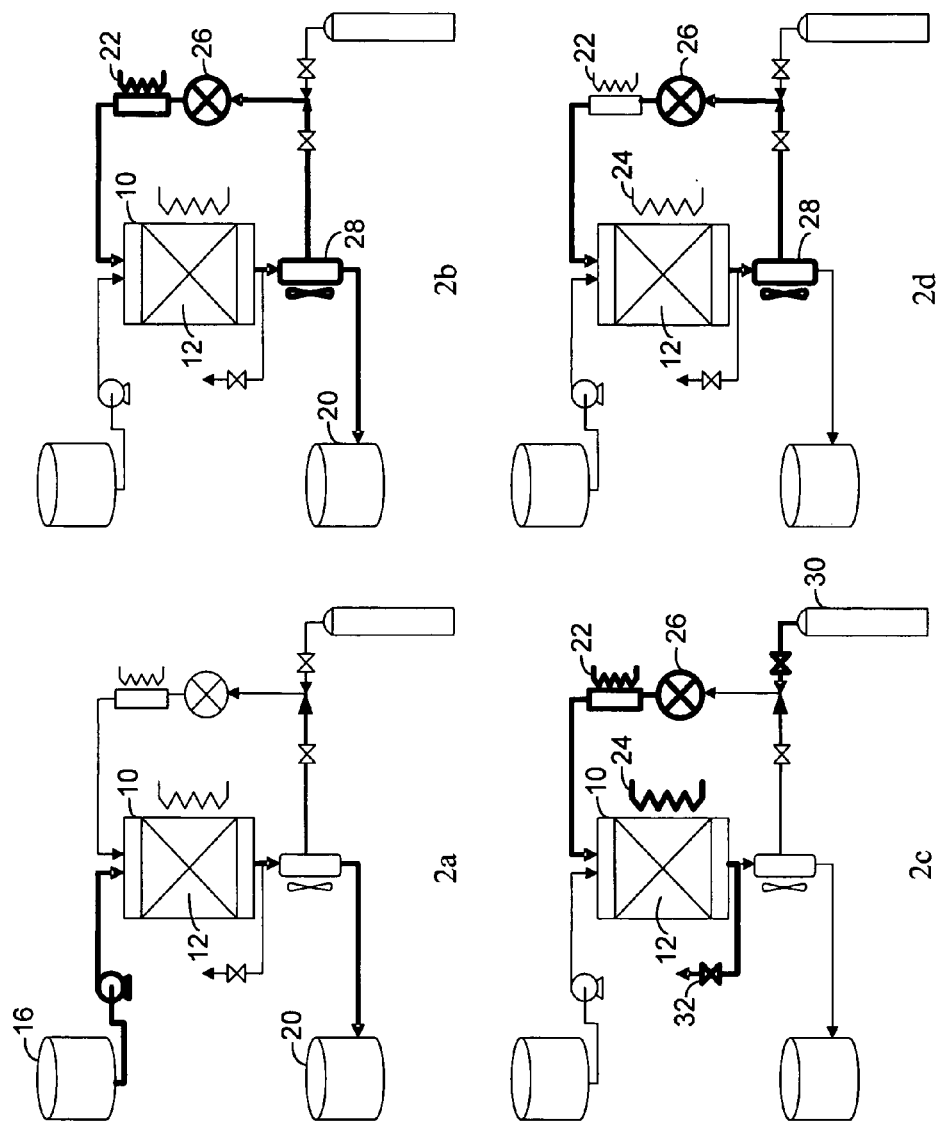
FIGS. 2a-d are steps in the regeneration process for regenerating the purifying adsorbent.

The process of regenerating the solvent is shown in FIG. 2a, and entails passing the solvent with contaminants, from a supply 16, over the adsorbent 12 in an adsorbent chamber 10 to remove the contaminants, generating a solvent effluent stream relatively free of impurities, and passing the effluent stream to a holding tank 20. The process continues until the concentration of contaminants in the purified solvent stream exiting the adsorbent chamber exceeds a preselected value. Preferably, the impurities are reduced to a level of less than or equal to 500 ppm by weight (<0.05%).

In another embodiment, the process of regenerating the solvent comprises contacting the solvent with a first adsorbent, and generating an intermediate solvent stream. The intermediate solvent stream is contacted with a second adsorbent to provide a purified solvent stream. The first adsorbent is selected for properties that preferentially adsorb impurities that are polar molecules. Polar molecules include surfactants, fatty acids, and tri-, di-, and mono-glycerides. The first adsorbent is preferably a zeolitic material, molecular sieve, a mesoporous silica-alumina, or mixtures thereof. The second adsorbent is chosen for properties that preferentially adsorb nonpolar molecules, such as waxes and hydrocarbons. The second adsorbent can include a variety of adsorbent materials such as for example, activated carbons. Alternatively, the adsorbents are contacted in the reverse order.

Upon reaching the preselected value of impurities in the solvent effluent stream, the flow of solvent to the adsorbent bed 12 is discontinued and the adsorbent chamber 10 is drained of all remaining solvent. The regeneration of the adsorbent entails several considerations. One consideration is the recovery of residual solvent from the adsorbent during the regeneration process. A second consideration is the convenient removal of impurities from the adsorbent.

To address these considerations, the regeneration of the adsorbent entails a two stage heating process for the regeneration of the adsorbent. A first stage heating of the adsorbent is at a temperature sufficient to remove any excess solvent from the adsorbent. The first stage heating step consists of heating the adsorbent in the adsorbent chamber to a temperature from about 150° C. to about 300° C., and preferably about 200° C. A preferred method is shown in FIG. 2b, where the excess solvent remaining in the adsorption chamber is vaporized and carried out in a gaseous phase in an effluent gas stream until the adsorbent 12 is dried. After the adsorbent chamber 10 is drained, a gas is heated by a heater 22, and passed through the adsorbent chamber 10, generating an effluent gas stream. The adsorbent 12 is heated with a hot non-reactive gas to vaporize residual solvent left in the adsorbent 12 generating a hot effluent gas stream. The hot effluent gas stream is passed through a condenser 28 cooling the gas stream and the residual solvent in the effluent gas stream is condensed and recycled to a storage tank 20. The cooled gas is recycled with a recirculation blower 26, and passed through the heater 22 to reheat the gas. The first stage is continued until the desired recovery of solvent is obtained. When the first stage heating step is finished, the gas can be vented or passed to other units for further processing, depending on the choice of gas for drying the adsorbent. In an alternative embodiment, after the first stage heating step, the gas can be mixed with oxygen or air and further heated to a higher temperature to oxidize or volatilize the contaminants remaining on the adsorbent.

The condensing unit 28 can be an air cooled or a water cooled heat exchanger, or depending on the load requirements, can be another type of condensing unit.

In a preferred embodiment, the heater 22 provides a low level heat for the first stage of heating. The heater 22 heats up a gas for removing residual solvent which is collected in the condensing unit 28. The second stage heater 24 is built into the adsorbent chamber 10 and only needs to heat up the adsorbent 12 to remove the impurities, thereby using less energy than would be used with a hot gas at the higher level second stage of heating.

The first stage heating can be performed in a number of ways. One method of heating is to pass a hot gas heated to a temperature of about 200° C. over the adsorbent. The hot gas vaporizes the solvent and carries the gaseous solvent out of the adsorbent chamber. Preferably, the gas used during the drying, or first stage heating, is a non-oxidizing, non-reacting gas to eliminate problems of potential combustion of the residual solvent. Non-oxidizing gases include, but are not limited to, nitrogen and carbon dioxide.

After the desired recovery of solvent is obtained, the second stage heating further heats the adsorbent, as shown in FIG. 2c. The adsorbent is further heated to a higher temperature to remove the contaminants remaining on the adsorbent. It has been found that the contaminants are desorbed, or even thermally decomposed and removed as gaseous decomposition products, from the adsorbent at temperatures in the range of about 400° C. to about 600° C. Preferably, the temperature is in the range from about 450° C. to about 500° C. A gas is supplied from a source 30 and heated through the heater 22 to a temperature sufficient to volatilize or decompose contaminants remaining on the adsorbent. The heated gas passes over the adsorbent 12 and picks up contaminants on the adsorbent 12. The heated gas with contaminants is then vented 32 or passed to other units for processing, depending on the degree of removal needed.

Optionally, the gas is heated to an initial temperature, and a second heater 24 located in, or around, the adsorbent chamber 10 heats up the adsorbent 12 to a temperature sufficient to desorb the contaminants, or to decompose the contaminants to volatile compounds that are removed in the gas stream. The contaminant can be decomposed by reaction with an oxidizing gas at reaction conditions. After removal of the contaminants, the adsorbent is cooled, and may be cooled by passing cooler air or gas over the adsorbent at a controlled rate. The adsorbent is cooled to the temperature at which the adsorption process is carried out. In another embodiment, the heating during the second stage involves using a heater attached to the adsorbent chamber. The heater can be an electric heater, a tube and fin heat exchanger with a hot fluid passing through the tubes, or any other type of heating unit capable of heating the adsorbent to a temperature from about 450° C. to about 600° C. This latter design reduces the heating load needed to heat the adsorbent, since the gas does not need to also be heated to the level of the adsorbent. In addition, a direct heater for the second stage heating does not require the continuous flow of gas over the adsorbent at the higher desorption temperature. Alternate designs are possible and are well known in the art.

The adsorbent is preferably a silica-alumina based mesoporous material. Mesoporous materials are materials having intermediate sized pores in the range from about 2 nm to about 50 nm. When the adsorbent is a zeolitic material, molecular sieve, mesoporous silica-alumina, etc. the heating and cooling of the adsorbent is performed under controlled conditions to prevent damage to the adsorbent. Cooling and heating rates of no greater than 2° C./min are preferred, with rates of no greater than 0.2° C./min more preferred.

While one method of removing the impurities, or contaminants, from the adsorbent is to pass a heated gas that volatilizes or oxidizes the impurities, which creates a volatile or oxidized product that is removed in the gas stream, another method for removing impurities comprises using steam to desorb, or decompose the impurities on the adsorbent 12. Using high temperature steam allows for designs where steam is available and can preclude the need for a second heating unit.

The vented gas containing the impurities can also be passed through a filter to trap volatile organic compounds, or to remove other harmful impurities that might be generated by the thermal decomposition of the adsorbed contaminants.

The final step in the process is shown in FIG. 2d, wherein the adsorbent 12 is cooled down to a temperature after the impurities have been removed. Gas is recirculated by a recirculation blower 26, and passed over the adsorbent 12. The gas is cooled by the condensing unit 28 to remove heat picked up from passing over the adsorbent 12. Following the cooling step, the adsorption process is repeated to process the solvent.

The process is repeatable, and can be performed until the adsorbent's adsorption capacity is reduced to a predetermined level. The capacity is reduced when the pore structure in the adsorbent collapses, is plugged by contaminants that cannot be removed, or otherwise the adsorbent breaks down. Typically, the process is repeatable up to about 100 cycles.

In an alternate embodiment, the adsorbent is drained and dried in a first heating step. The first heating step is at a temperature from about 150° C. to about 300° C. and is for recovering residual solvent that is left on the adsorbent after draining. Subsequent to drying, the adsorbent is washed with an extraction solvent. The extraction solvent is passed over the adsorbent and removes the contaminants adsorbed onto the adsorbent. This embodiment exchanges the cost of heating the adsorbent, for costs associated with processing the extraction solvent.

In the embodiment using two adsorbents for removing polar molecules and non-polar molecules, regeneration of each adsorbent can require different conditions. For a typical contaminated solvent, the impurities comprise approximately 90% polar compounds and about 10% non-polar compounds. The first adsorbent for removing the polar compounds is regenerated through a two stage heating process, as described above. The second adsorbent, used to remove non-polar hydrocarbons, can be regenerated through a two stage heating process, or alternatively the second adsorbent can be disposed of and replaced with fresh adsorbent. This is a small portion of adsorbent relative to the total amount of adsorbent used. The second adsorbent, optionally, is heated to a first temperature to recover residual solvent from the adsorbent, before disposing of the second adsorbent.

The apparatus may further be expanded to have multiple adsorbent beds 12. The process can use one or more adsorbent beds while one or more adsorbent beds are undergoing regeneration of the adsorbent. An apparatus with multiple adsorbent beds 12 would not require duplication of other components in the apparatus, such as the gas heater 22, recirculation blower 26, and condensing unit 28. The use of multiple adsorbent beds can allow for continuous processing of the contaminated solvent.

Simulations were carried out for determining the optimum parameters for the apparatus. The studies looked at the power consumption as a function of cooling medium, and apparatus design using a one adsorption chamber and two adsorption chambers. The condensing unit was simulated to be either a water cooled condenser, or an air cooled condenser. The simulations revealed that a two adsorption chamber system with water cooling resulted in a lower power consumption than other apparatus designs simulated. This is in agreement with the idea of using multiple adsorbent beds, and only regenerating adsorbent beds that have been fully loaded with contaminants.

During operation, the adsorption process is run until a breakthrough in the concentration of contaminants is recorded at the outlet of the adsorption unit. After breakthrough occurs, the adsorption process is discontinued and the regeneration of the adsorbent begins. For a single adsorption bed, or adsorption unit, the bed is never fully loaded when regeneration begins. In addition, it can be easier to just run the adsorption system for a fixed time that is less than necessary for breakthrough to occur. This obviates the need for potentially expensive monitoring equipment.

An alternative arrangement is to use at least two adsorption units in series. The adsorption process is run until the first bed in the series is completely loaded, and the beds are arranged and sized to insure that breakthrough does not occur for the second, or last, bed in the series. The adsorbent units are then taken off line. The first bed is then regenerated, after being fully loaded and after regeneration of the first bed the adsorption process is resumed. However, through appropriate piping and valves, the sequence of the beds is such that the first bed is moved to be the last bed in the series. When using a two bed system with regeneration of a single bed at a time, there is less power used each regeneration cycle and the overall bed life is extended by regenerating only beds that are fully loaded with contaminants.

Other arrangements are possible with multiple adsorbent beds, and it is contemplated that the present invention covers them. Among the possible arrangements include, but not limited to, multiple beds in a parallel arrangement providing for continuous operation; multiple beds in a combination parallel and series operation providing continuous operation while only regenerating completely loaded adsorbent beds; and multiple beds in series that allows an individual bed to be taken off-line.

In addition, other methods may be combined with this process to regenerate the adsorbent beds, including but not limited to, passing a solvent over one or more of the beds to remove impurities. As an example, the apparatus may contain one or more main adsorbent beds for removing most of the impurities and comprising a first adsorbent, and a secondary bed with a second adsorbent for removing a specific contaminant. The second adsorbent requires a different treatment due to its different physical properties and composition. The second adsorbent has an extraction solvent passed over it after the second adsorbent has been dried. This and other combinations are contemplated to be within the scope of the invention.

EXAMPLE

A variety of adsorbents were tested covering a range of parameters. Among the tested adsorbents were:
activated carbons with different surface areas, and different porosities;
alumina with different surface areas, and different porosities;
silica gel with different surface areas, and different porosities;
zeolites with different structures and pore sizes; and mesoporous materials, such as MCM-41.

A summary of the results of the use of various adsorbents shows the removal of impurities from the D5 solvent.

TABLE 1

| Adsorbent Description | Surfactant removal, % | Fatty Acids removal, % | Triglycerides removal, % | Hydrocarbons Removal, % |
|---|---|---|---|---|
| Darco ™ MRX | 96.69 | 93.1 | 90.85 | 88.05 |
| UOP's LECO Carbon | 76.53 | 87.61 | 85.34 | 51.94 |
| $CaCO_3$ | 13.91 | 6.9 | 15.66 | −0.85 |
| Calgon Carbon | 91.57 | 95.04 | 91.52 | 96.35 |
| BaKX Zeolite | 14.41 | 60.54 | −14.89 | 0 |
| KY Zeolite | 83.04 | 95.64 | 13.75 | 5.64 |
| Aldrich $SiO_2$ | 97.93 | 91.45 | 92.74 | 0 |
| GraseDavison $SiO_2$ | 96.11 | 90.75 | 92.58 | 0 |
| SORBPLUS | 40.47 | 91.9 | −2.91 | 0 |
| A-201 | 97.06 | 94.18 | 90.68 | −0.59 |
| A-204-1 | 88.9 | 99.25 | 96.43 | 0 |
| AZ-300 | 95.36 | 99.23 | 97.5 | 29.01 |
| S-115 | 0.55 | 63.34 | −1.8 | 0 |
| TMC $SiO_2$ | 3.16 | 3.6 | 2.22 | 0 |
| F-Silicalite | 10.4 | 86.31 | 7.28 | 0 |
| R-gCB | 79.72 | 98.69 | 53.25 | 0 |
| MFI Zeolite | 38.81 | 87.54 | 2.94 | 0 |
| MCM-41 | 92.16 | 98.97 | 97.9 | 0 |
| 13X | 86.66 | 95.69 | 32.77 | 0 |

From the tests mesoporous carbon from Darco™ MRX by Norit Americas Inc., in Marshall, Tex., and carbon from Calgon Carbon Corp., Pittsburgh, Pa., showed good results. Silicas produced by Aldrich, Sigma-Aldrich Co., St. Louis, Mo. and Grase Davison also performed well. Other materials that performed well were commercial UOP alumina adsorbents A-201, A-204-1, AZ-300; and the mesoporous silica material MCM-41. MCM-41 is well known in the art, and its synthesis can be found in the literature. Other materials tested include LECO carbon, which is a UOP high surface area, uniform porosity carbon; and TMC $SiO_2$ which is a sylated silica. F-silicalite, R-gCB, MFI, and 13X are zeolites and are known in the art. F-silicalite is fluorinated silicalite.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A method of removing contaminants from a stream comprising silicone based solvents comprising:
contacting the stream with an adsorbent in an adsorption chamber and at adsorption conditions to remove at least a fraction of the contaminants thereby generating a purified stream, wherein the adsorbent is selected from the group consisting of alumina, metal oxides, silica, zeolites, molecular sieves, mesoporous silica-alumina and mixtures thereof; and
regenerating the adsorbent with a two stage heating process at regeneration conditions, wherein the first stage comprises heating to a driving temperature between about 150° C. to about 300° C. over the adsorbent to produce an effluent gas stream, and the second stage comprises heating the adsorbent from the drying temperature to a desorption temperature from about 450° C. to about 500° C.

2. The method of claim 1 further comprising carrying out the contacting step until the purified stream contains greater than a pre-determined level of contaminants.

3. The method of claim 1 further comprising prior to regenerating the adsorbent draining the solvent remaining in the adsorption chamber from the adsorption chamber.

4. The method of claim 1 wherein the contaminants in the purified stream are reduced to less than 0.05% by weight.

5. The method of claim 1 further comprising condensing at least a portion of any residual solvent in the effluent gas stream.

6. A method of removing contaminants from a stream comprising silicon based solvents comprising:
contacting the stream with a first adsorbent in an adsorption chamber and at adsorption conditions to remove at least a fraction of the contaminants thereby generating an intermediate product stream, wherein the adsorbent is selected from the group consisting of alumina, metal oxides, silica zeolites, molecular sieves, mesoporous silica-alumina and mixtures thereof;
contacting the intermediate product stream with a second adsorbent in an adsorption chamber and at adsorption conditions thereby generating a purified stream; and
regenerating the adsorbents with a two stage heating process, wherein the two stage heating process comprises a first drying stage heating to a drying temperature between 150° C. to 300° C. and a second stage at desorption conditions heating to a temperature between 450° C. to 500° C.

7. The method of claim 6 wherein the first adsorbent has substantially reached its adsorption capacity, and is regenerated at regeneration conditions.

8. The method of claim 7 wherein the second adsorbent is heated to a first desorption temperature to recover at least a portion of any residual solvent.

9. The method of claim 6 wherein the desorption conditions comprise passing steam over the adsorbent.

10. The method of claim 6 wherein the desorption conditions comprise passing an extraction solvent over the adsorbent after drying the adsorbent.

11. The method of claim 6 further comprising cooling the adsorbent after the regeneration step.

12. The method of claim 7 wherein contacting the solvent with the first adsorbent removes impurities comprising polar compounds, and contacting the intermediate solvent stream with the second absorbent removes impurities comprising non-polar compounds.

* * * * *